July 18, 1961 G. J. HEBERT Re. 25,008

SOAP POWDER MEASURING DISPENSER

Original Filed May 15, 1958 2 Sheets-Sheet 1

INVENTOR.
GERARD J. HEBERT

BY

H. G. Manning
ATTORNEY.

SOAP POWDER MEASURING DISPENSER

Original Filed May 15, 1958 2 Sheets-Sheet 2

INVENTOR.
GERARD J. HEBERT

BY
H. G. Manning
ATTORNEY.

United States Patent Office

Re. 25,008
Reissued July 18, 1961

25,008

SOAP POWDER MEASURING DISPENSER

Gerard J. Hebert, 89 Clowes Terrace, Waterbury, Conn.

Original No. 2,898,013, dated Aug. 4, 1959, Ser. No. 735,444, May 15, 1958. Application for reissue Jan. 14, 1960, Ser. No. 2,556
8 Claims. (Cl. 222—455)

Matter enclosed in heavy brackets [ ] appears in the original patent but forms no part of this reissue specification; matter printed in italics indicates the additions made by reissue.

This invention relates to dispenser and more particularly to a detachable metering dispenser for delivering measured quantities of granular material, such as soap powder, from a cardboard package.

Previous dispensers for granular material have either been inaccurate or too costly to manufacture or difficult to incorporate into the presently used inexpensive package. With the present popular use in the home of automatic clothes washers, the need for an accurate and inexpensive metering dispenser for soap powder has become extremely desirable.

One object of the present invention is to provide an inexpensive dispenser for granular material of the above nature which will be simple to operate, easy to insert into and remove from a standard package, and very efficient and durable in use.

With these and other objects in view, there have been illustrated on the accompanying drawing two forms in which the invention may conveniently be embodied in practice.

Figure 1:
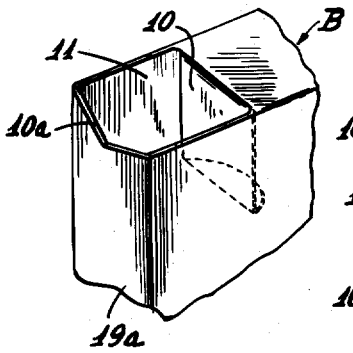
FIG. 1 represents a perspective view of the top portion of a soap box having a square end flap punched inwardly to permit the insertion of the dispenser.
Figure 2:
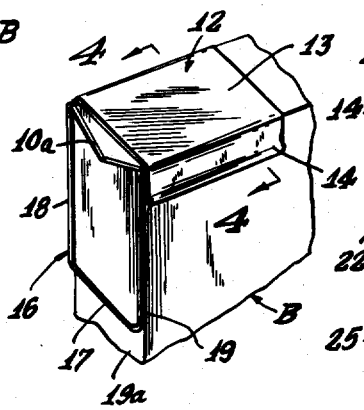
FIG. 2 is a similar perspective view of the first form of the dispenser, as it appears after it has been inserted downwardly into the square aperture at the top corner of the soap box.
Figure 4:
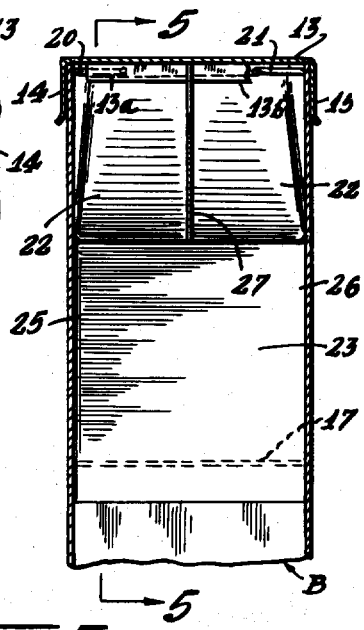
FIG. 4 is a vertical cross-sectional view, taken along the line 4—4 of FIG. 2.
Figure 3:
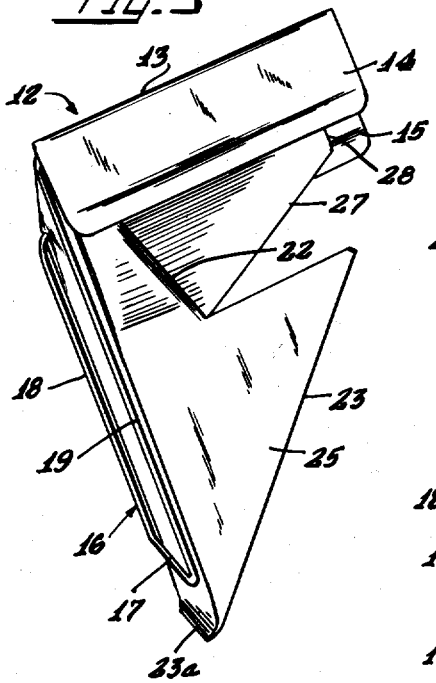
FIG. 3 is a perspective view of the first form of the dispenser, shown by itself on a larger scale.

The improved dispenser herein disclosed comprises an elongated triangular structure preferably of molded plastic material and having a sharp point at its lower end to facilitate its insertion into a square opening in the top corner of a cardboard package of powder soap or other material.

Referring now to the drawing, in which like reference numerals denote corresponding parts through out the several views, the numeral 10 indicates the top flap of a rectangular cardboard soap box B, as it appears after it has been pressed inwardly and downwardly along the usual perforated lines, to provide a square opening 11 in the top of the box for receiving the plastic dispenser attachment 12, generally triangular in shape.

A V-shaped vertical opening 10a is left in the top of the front of the box B.

The dispenser 12 has a horizontal top 13, from which depend a pair of side flanges 14 and 15 having out turned lower ends to facilitate the fitting of the dispenser tightly over the top sides of the soap box B. The dispenser 12 is also provided with a forward U-shaped detachable wire loop 16 which is adapted to be located on the outside of the front wall of the box, said loop having a horizontal bottom section 17 and a pair of upstanding side legs 18 and 19 which are resiliently urged against the front wall of the soap box B.

The side legs 18 and 19 are provided at their upper ends with inwardly inclined feet 20 and 21, which are located underneath the top wall 13 and detachably positioned within a pair of horizontal diagonally inclined channels 13a and 13b.

Provision is also made of a pair of inclined top and bottom webs 22 and 23 spaced apart from and located at substantially right angles to each other, providing a horizontal rectangular opening 24, therebetween, through which the soap powder is adapted to pass during the dispensing operation.

The dispensing attachment 12 is also provided with a pair of vertical side walls 25 and 26, which are secured to the ends of the inclined webs 22 and 23.

Provision is also made of an upper vertical central web 27 secured to the top wall 13 and the upper inclined web 22, said central web having a short vertical rear edge 28.

OPERATION

Figure 5:
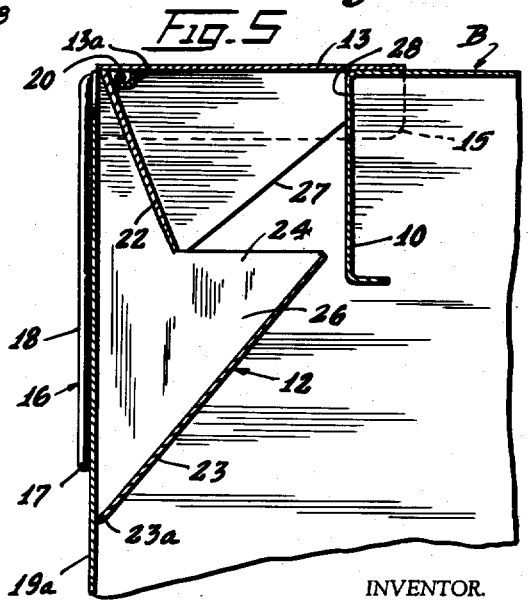
FIG. 5 is a vertical cross-sectional view, taken along the line 5—5 of FIG. 4.
Figure 6:
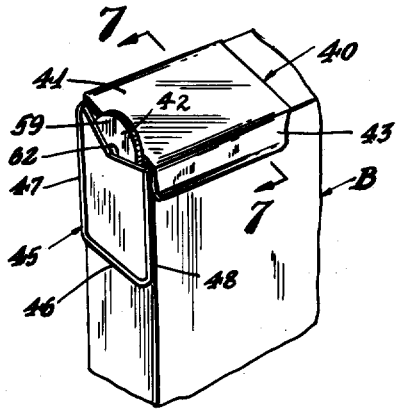
FIG. 6 is a perspective view, similar to FIG. 2, of the top corner of a soap box, showing the second form of dispenser installed therein.
Figure 7:
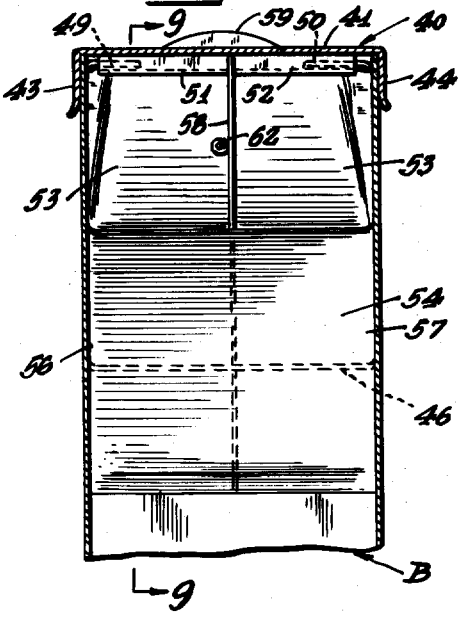
FIG. 7 is a sectional view of the same, taken along the line 7—7 of FIG. 6.
Figure 8:
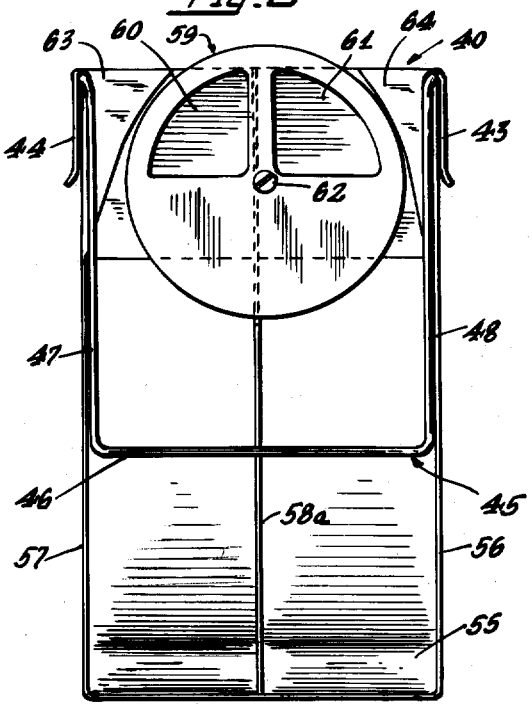
FIG. 8 is a front view of the second form of the dispenser, shown by itself.

In dispensing the powder or granular material from the soap box B, the latter will first be opened by forcing the flap 10 partly inwardly along the perforated lines at the upper corner thereof. The flap 10 will then be swung farther inwardly out of the way by means of the rear edge 28 of the central web 27, to the vertical position shown in FIG. 5.

When the packabe B is tilted in a counterclockwise direction, a measured quantity of soap from the box will flow through the space between the bottom inclined web 23 and the vertical flap 10, and will remain between the web 22 and the top 13 until the box is tilted clockwise, and then counterclockwise again to dispense the powder from the box.

SECOND FORM

In the second form of the invention as shown in FIGS. 6 to 9, provision is made of a plastic dispenser attachment 40, also of triangular shape. The dispenser 40 is provided with a horizontal top section 41 and an open front section 42, having a pair of short outwardly curved depending flanges 43 and 44, similar to the flanges 14 and 15 of the first form of the invention.

A U-shaped wire loop 45 is secured to the open front of the dispenser, for location outside of the front wall of the box and presses resiliently inwardly upon said wall. The loop 45 has a horizontal bottom section 46 and a pair of vertical side legs 47 and 48 terminating at their upper ends in inwardly horizontal inclined channels 51 and 52, secured to the under surface of the top wall 41.

Figure 9:
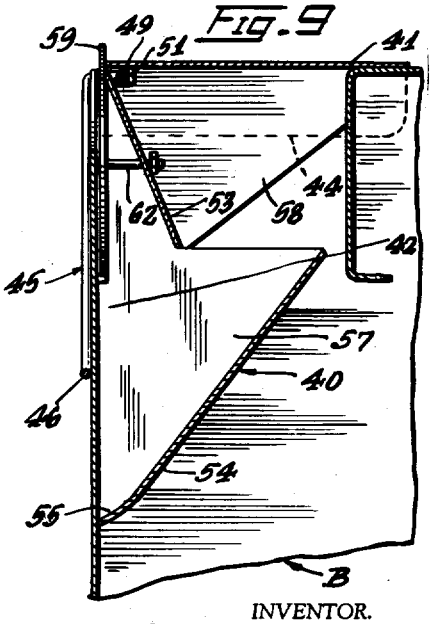
FIG. 9 is a cross-sectional view, taken along the line 9—9 of FIG. 7.

Provision is also made of a pair of inclined top and bottom webs 53 and 54, similar to the webs 22 and 23 of the first form, said webs 53 and 54, being spaced apart, located substantially at right angles to each other, and being secured to the side walls 56 and 57 of the dispenser 40. The lower web 54 is provided with a curved bottom 55, as shown in FIG. 9.

Provision is also made of a top central web 58, secured to said walls 56 and 57. A lower central partition 58a is also provided to divide the dispenser into two side sections whereby one or both side sections may be engaged as desired.

In the second form of the invention, a vertical circular dial plate 59 is provided at the front of the dispenser, and has a pair of quarter sector openings 60 and 61 therein. The dial plate is rotatably mounted on a horizontal pivot bolt 62, which extends inwardly through the upper inclined web 53, as clearly shown in FIG. 9. The dial plate 59 is adapted to fit snugly flush against the front of the box and is embraced at its top sides by a pair of arcuate shoulder lugs 63 and 64 to cause the powder to pass from the sides of the central partition 58a only through the sector openings 60 and 61.

In the operation of the second form of the invention, when the dial plate 59 is twisted manually around the axis of the pivot bolt 62, to open one of the sectors 60, 61 of the dial, dispensing of one measured quantity of soap will be permitted and when the dial plate 59 is twisted to open both of the sectors 60, 61, a larger measured quantity will be dispensed. In all other positions of the dial plate the box will be closed.

While there have been disclosed in this specification two forms in which the invention may be embodied, it is to be understood that these forms are shown for the purpose of illustration only, and that the invention is not limited to the specific disclosures, but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

[1. In a measuring dispenser for powder soap or other material, an attachment having a flat rectangular top section adapted to lie upon the top of a cardboard package, said attachment being open at the front and having vertical triangular sides, a rearwardly and upwardly inclined lower web extending part way toward said top section, a downwardly and rearwardly inclined upper web spaced from said lower web and joined to said top section, a central vertical top web secured to said top section to engage the corner flap bent downwardly and rearwardly from the top corner of said box, the space between said top section and said upper web serving to determine the amount of powdered material which will be dispensed each time the box is tilted back and forth to cause the powder to enter and leave said dispenser when it is located within the square top opening in said package.]

2. The invention as defined in claim [1], *8* in which provision is made of a U-shaped resilient wire clip detachably secured to said top [wall] *section* and located outside the front of said package to press it inwardly against the open front of said attachment.

3. The invention as defined in claim [1], *8* in which said upper and lower webs are located in planes at substantially right angles to each other.

4. The invention as defined in claim [1], *8* in which said [central] *vertical* web has a vertical rear edge.

5. The invention as defined in claim [1], *8* in which the upper portion of said open front [section] has a double apertured dial plate rotatably secured to the upper [inclined] web, to permit the dispensing of two different measured quantities of powder according to the location of the apertures of said plate.

6. The invention as defined in claim 5, in which the top sides of said [disc] *dial plate* are embraced by a pair of arcuate lugs to cause the powder being dispensed to pass only through said apertures.

[7. The invention as defined in claim 5, in which the dispensing attachment is provided with a central lower partition to cause the powder to pass on both sides thereof.]

*8. A measuring dispenser for use with a package provided with an opening formed by cutting a flap in a top corner of the package, said dispenser comprising, a flat top section adapted to lie upon the top of said package, vertical side walls joined to said top section and defining therewith an open front, a rearwardly and upwardly inclined lower web joined to said side walls and extending toward but terminating short of said top section, a downwardly and rearwardly inclined upper web joined to said top section and extending toward but terminating short of said lower web, a vertical web joined to one of the rearwardly inclined webs to engage and bend the flap of said package opening downwardly and rearwardly from the top corner of said package when the dispenser is inserted within said opening, the space between said top section and said upper web serving to determine the amount of powdered material that will be dispensed each time said package is tilted to cause said powdered material to enter and leave said dispenser.*

*9. A measuring dispenser for use with a package provided with an opening formed by cutting a flap in a top corner of the package, said dispenser comprising a flat top section adapted to lie upon the top of said package, vertical side walls joined to said top section, a rearwardly and upwardly inclined lower web joined to said side walls and extending toward but terminating short of said top section, a downwardly and rearwardly inclined upper web joined to said top section and extending toward but terminating short of said lower web, a vertical web joined to one of the rearwardly inclined webs to engage and bend the flap of said package opening downwardly and rearwardly from the top corner of said package when the dispenser is inserted within said opening, the space between said top section and said upper web serving to determine the amount of powdered material that will be dispensed each time said package is tilted to cause said powdered material to enter and leave said dispenser.*

*10. The invention as defined in claim 9, in which the dispenser is provided with a central lower partition to cause the powdered material to pass on both sides thereof.*

References Cited in the file of this patent or the original patent

UNITED STATES PATENTS

| | | |
|---|---|---|
| 1,679,237 | Birnbaum | July 31, 1928 |
| 2,092,983 | Milward | Sept. 14, 1937 |
| 2,523,426 | Gray | Sept. 26, 1950 |
| 2,630,251 | Edwards | Mar. 3, 1953 |
| 2,768,772 | Franseen et al. | Oct. 30, 1956 |
| 2,799,436 | Bernhardt | July 16, 1957 |